(12) United States Patent
Hoefner et al.

(10) Patent No.: US 6,507,692 B1
(45) Date of Patent: Jan. 14, 2003

(54) ISOLATOR FOR PASSING AN OPTICAL CABLE HELD ON A PHASE LINE OF A HIGH TENSION AERIAL LINE

(75) Inventors: Roland Hoefner, Kueps (DE); Dieter Kreutz, Gruenwald (DE); Ernst Mayr, Starnberg (DE)

(73) Assignee: CCS Technology, Inc., Wilmington, DE (US)

( * ) Notice: Subject to any disclaimer, the term of this patent is extended or adjusted under 35 U.S.C. 154(b) by 0 days.

(21) Appl. No.: 09/806,330
(22) PCT Filed: Sep. 1, 1999
(86) PCT No.: PCT/DE99/02764
§ 371 (c)(1), (2), (4) Date: Jun. 25, 2001
(87) PCT Pub. No.: WO00/19257
PCT Pub. Date: Apr. 6, 2000

(30) Foreign Application Priority Data

Sep. 29, 1998 (DE) .......................... 198 44 733

(51) Int. Cl.[7] .................................................. G02B 6/00
(52) U.S. Cl. .................................... 385/136; 174/137 R
(58) Field of Search ................................ 385/136, 137, 385/138; 174/137 R, 138 R, 139, 148, 155, 156, 182, 192

(56) References Cited

U.S. PATENT DOCUMENTS

| 4,263,476 A | * | 4/1981 | Netzel .......................... 174/156 |
| 4,611,868 A | * | 9/1986 | Matsui et al. ................ 174/135 |
| 4,921,322 A | * | 5/1990 | Seike et al. .................. 174/139 |
| 5,109,466 A | * | 4/1992 | Seike et al. .................. 385/137 |
| 5,446,242 A | * | 8/1995 | Barrett .................... 174/137 R |
| 5,877,453 A | * | 3/1999 | Hill ............................. 174/179 |
| 6,118,918 A | * | 9/2000 | Gross et al. ................. 385/138 |

FOREIGN PATENT DOCUMENTS

| DE | 32 42 008 | | 5/1984 |
| DE | WO97/48996 | * | 12/1997 |
| DE | 196 48 755 | | 5/1998 |
| EP | 0 303 740 | | 2/1989 |
| GB | 2 064 236 | | 6/1981 |
| GB | 2 079 069 | | 1/1982 |

* cited by examiner

*Primary Examiner*—Tulsidas Patel

(57) ABSTRACT

The insulator is constructed in two parts and can, therefore, also be fastened to an already-laid ADL cable. The two glued insulator halves, which are reinforced by sleeves that are pushed on at the end, are each made of a half-pipe having transverse and longitudinal stability, as well as an insulator element that partially surrounds the half-pipe. A casting resin brought into the cylindrical hollow space of the insulator connects the half-pipes sealed at the end with silicone stoppers, the GFK rod, and the cable to form a stable unit.

15 Claims, 5 Drawing Sheets

FIG 2
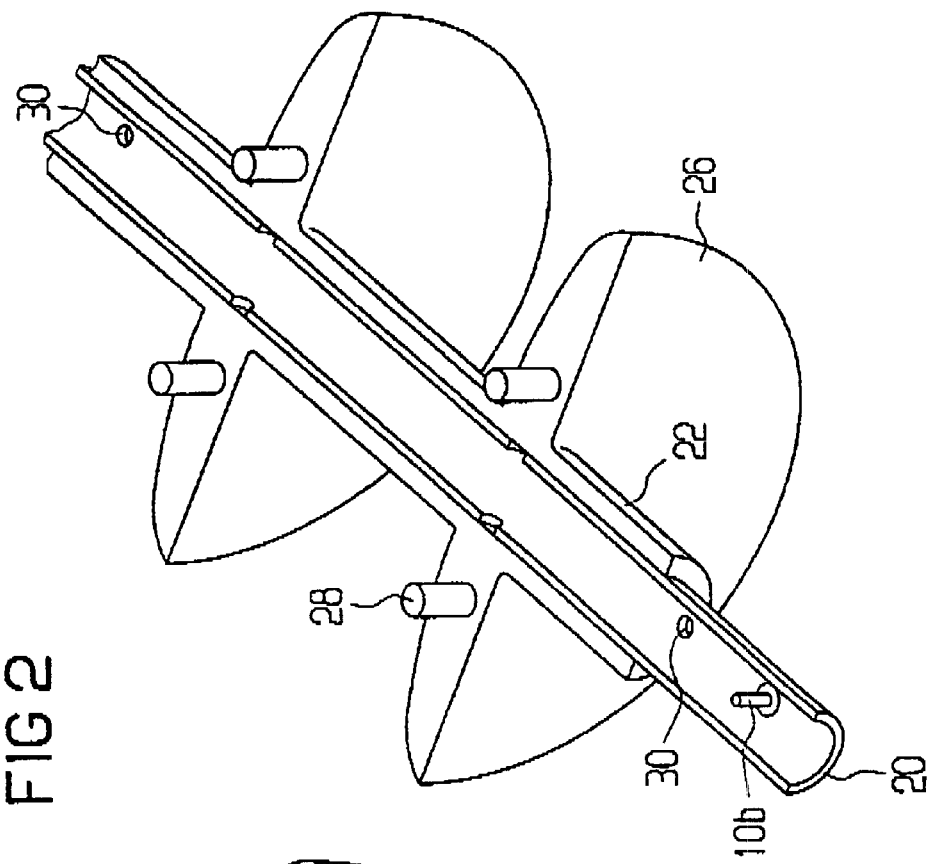
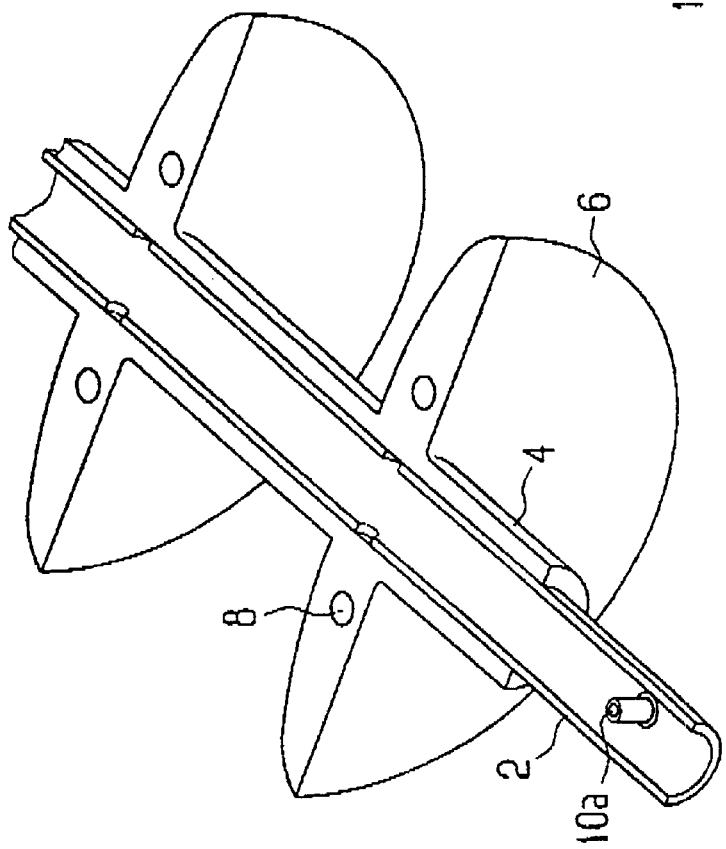

ISOLATOR FOR PASSING AN OPTICAL CABLE HELD ON A PHASE LINE OF A HIGH TENSION AERIAL LINE

BACKGROUND OF THE INVENTION

In order to prevent danger to assembly and/or maintenance personnel, the optical communication cable held on the phase cable of a high-voltage aerial line by an adhesive strip must be led in a voltage-free fashion, i.e., at ground potential, to the cable fitting fastened to the tower. The decoupling from the high-voltage of the phase cable is standardly accomplished by an insulator positioned before the cable fitting, through which the ADL (All Dielectric Lash) cable, as it is called, is routed. Corresponding insulators are known from EP 0 303 740 A1 and from DE 196 48 755 A1. However, these insulators cannot be retrofitted onto already-laid ADL cables.

In DE 32 42 008 A1, a suspension device is specified that is used for the guiding of, in particular, light waveguide cables. This device comprises a guide part for guiding the light waveguide cable, which part is fastened to a tower for the high-voltage line. At both sides of the guide part, the suspension device is provided with a respective insulating element. The respective insulating element can be made up of a multiplicity of individual elements that can be put together.

SUMMARY OF THE INVENTION

The subject matter of the invention is an insulator with which, in particular, an already-laid ADL cable can be guided and can be decoupled from the high voltage of the phase cable, and/or with which a disconnecting switch can easily be jumped or bypassed. This object is achieved according to the invention by an insulator comprising two parts, which can be assembled around the cable, each part has a half-pipe and an insulator element that is connected to the half-pipe.

The proposed insulator contains two half-pipes or half-shells having sufficient transverse and longitudinal stability, and preferably made of glass-fiber-reinforced plastic (GFK), as well as an insulator element that surrounds the half-pipes at least partially and is made of silicone. In order to enable the individual components to be joined and held in this position more easily, the half-pipes and the insulator element are respectively equipped with guide pins or, respectively, guide openings or bored guide holes, situated opposite each other.

In one of the half-pipes, a GFK rod protruding from the half-pipe can be glued in, whereby the GFK rod and the ADL cable to be guided through preferably have the same diameter.

At least one of the half-pipes comprises, outside the region covered by the insulator element, bored filling holes and bored ventilation holes, in order to enable the hollow space formed by the joined halves to be filled with a high-voltage-stable or electrically insulating material, preferably an epoxy resin (e.g., Protolin), or, respectively, to allow the air displaced by the filling compound to escape.

After the two insulator halves have been joined, a slit or slotted sleeve, preferably made of GFK, is pushed onto each of the two cylindrical insulator ends and is glued to the half-pipes.

In the assembly of the insulator, a twin-chamber sack containing a sufficient quantity of a two-component silicone resin (preferably LSR—Liquid Silicone Rubber) is preferably used. After the two components have been mixed, the silicone resin is applied to the edge surfaces of the silicone insulator halves, and the insulator halves are placed together and are heated to approximately 100° C. for approximately five minutes, and are thereby adhesively bonded to each other. Subsequently, the epoxy casting resin, which is used as a filling compound, preferably Protolin 51, is brought, via the bored filling holes, into the hollow body, which is sealed at its end side by means of two silicone stoppers. This resin fuses with the ADL cable(s) fixed in the respective half-pipe by a plastic compound (e.g., Prestik), with the GFK rod glued into one of the half-pipes, and with the insulator halves, to form a unit having tensile strength.

The insulator without GFK rod, placed on supports or hanging on the line or phase cable, can jumper the tower or a disconnected switch.

BRIEF DESCRIPTION OF THE DRAWINGS

FIG. 2 is a perspective view of two halves of the insulator, not yet filled and sealed at the end.

DESCRIPTION OF A PREFERRED EMBODIMENT

Figure 1:
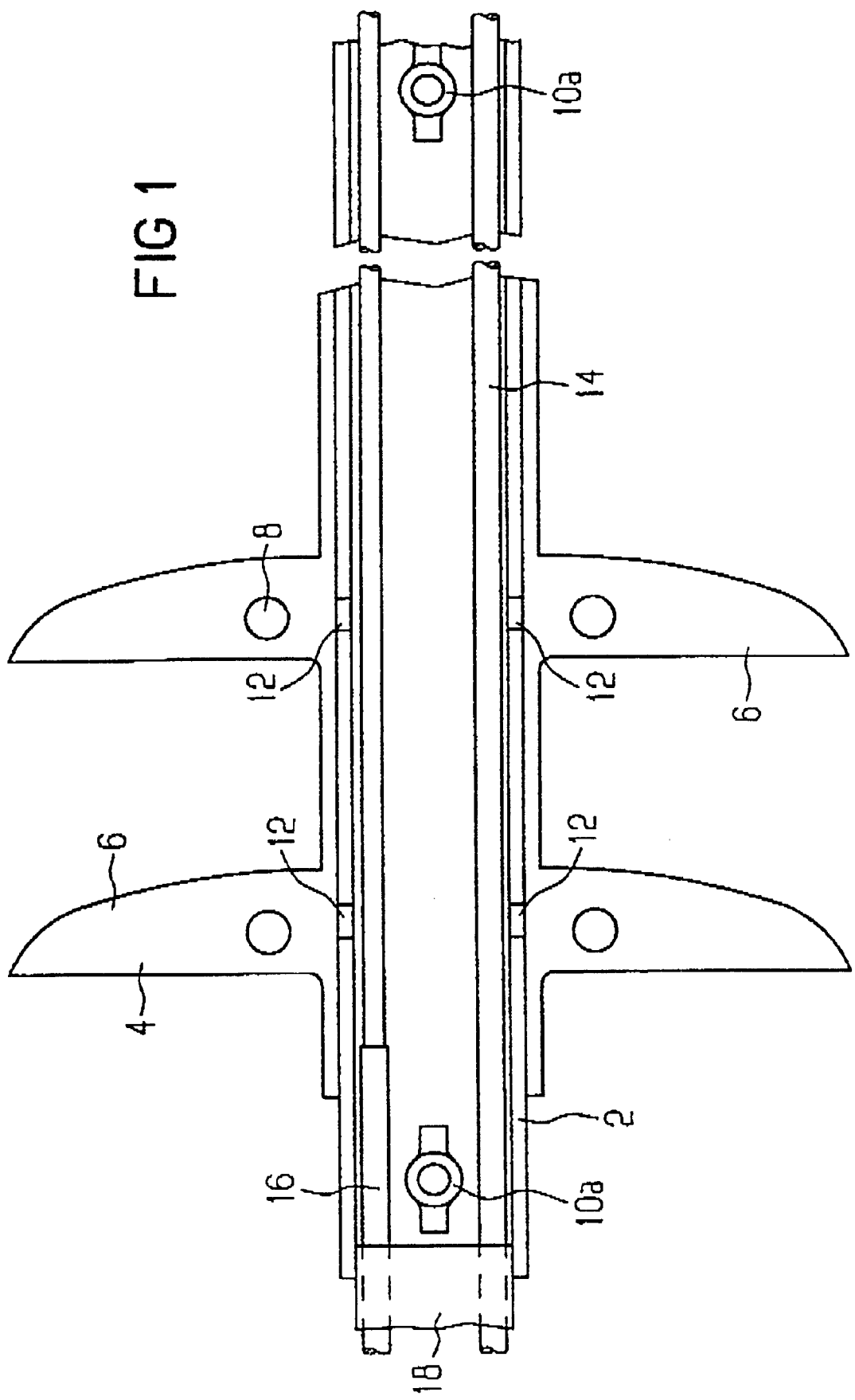
FIG. 1 is a plan view showing one half of the insulator.

The lower insulator half, shown in FIG. 1, comprises a semi-cylindrical half-pipe or half-shell 2 and an insulator element 4 that comprises a likewise semi-cylindrical part that abuts immediately on the half-pipe 2, as well as two silicone shields or fins 6 that extend at a right angle to the semi-cylindrical part and that are formed in the shape of semicircular disks. While the insulator element 4 is preferably manufactured from LSR (Liquid Silicone Rubber) or another silicone material, the half-pipe 2, which has transverse and longitudinal stability, is made of an epoxy or polyester resin. The bored holes 8 present in the silicone shields 6 of the insulator element 4 are used for the reception and guiding of the connection pins 28 that are present at corresponding points of the insulator element 22 with fins or shields 26 of the second insulator half (see the right part of FIG. 2). The half-pipe 2 is also equipped with hollow cylindrical openings or sleeves 10a for the guiding of the pins 10b present in the second half-pipe 20. In addition, the half-pipe 2 contains a bored hole 12 that is used for the filling of the assembled insulator. In FIG. 1, an epoxy rod 14 is glued into the half-pipe 2, and the ADL cable that is to be guided through and maintained at ground potential is designated 16. The construction of the cable 16 inside the insulator is described in detail in DE 196 48 755 A1, and requires no further explanation here. Two silicone stoppers 18 that are respectively cut open, i.e., that can be divided, seal the insulator at its end side.

FIG. 2 shows the two insulator halves, each in a perspective view, before the joining, whereby identical reference characters designate corresponding elements already described in their function and operation. The upper insulator half shown in the right part of FIG. 2 is again made up of a GFK half-pipe 20 and an insulator element 22 that is manufactured from silicone and that comprises a part 22 that abuts immediately on an outer surface of the half-pipe 20. The insulator element 22 also has two silicone shields 26 that extend at right angles to said part 22 and are fashioned as semicircular disks. The position of the guide pins 28 on the cut surfaces of the silicone shields 26 corresponds to the position of the bored guide holes 8 present in the insulator element 4 of the other insulator half. The evacuation of air from the insulator body during the filling takes place via the bored holes 30 present in the half-pipe 20. Finally, the right part of FIG. 2 shows the guide pins 10b arranged at a point inside the half-pipe 20 corresponding to the position of the openings or sleeves 10a.

Figure 3:
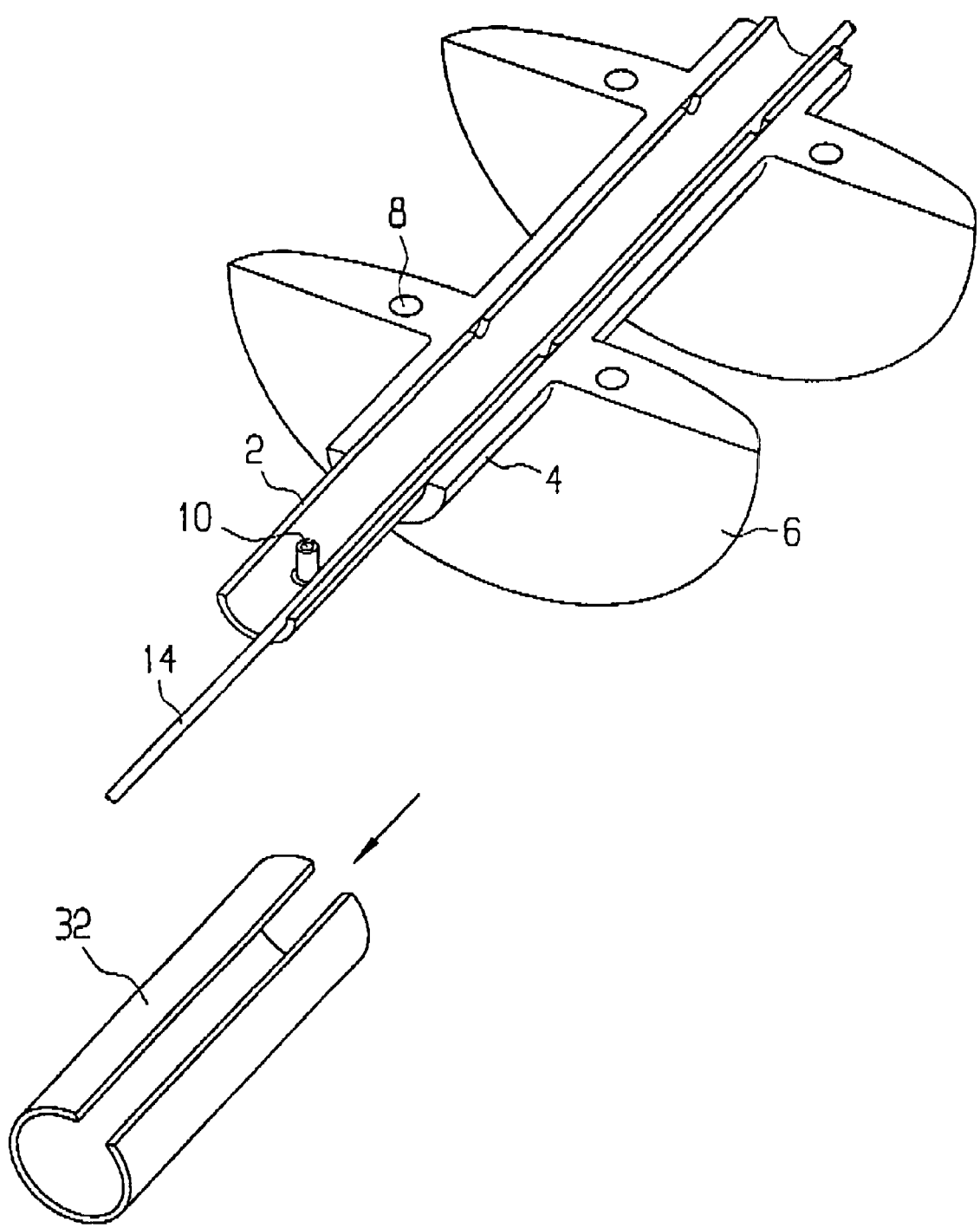
FIG. 3 is a perspective view of an insulator half provided with a GFK rod and a GFK sleeve to be applied at the end.

FIG. 3 shows the lower insulator half with the GFK rod 14 fixed therein by gluing, as well as one of the two GFK sleeves 32, each of which is slit. After the joining of the insulator halves, these sleeves 32 are pushed onto the respective cylindrical ends of the insulator, are rotated, and are glued to the GFK half-pipes 2 and 20.

Figure 4:
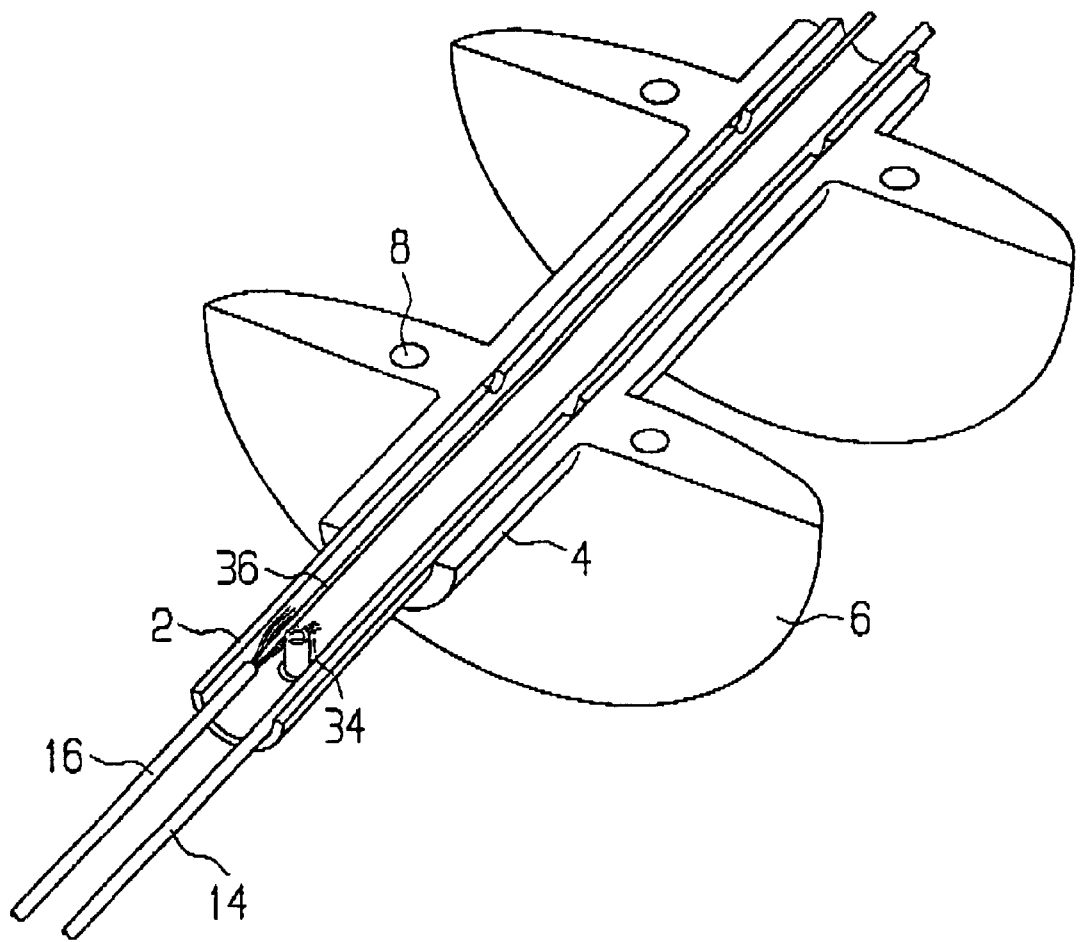
FIG. 4 is a perspective view according to FIG. 3, including the communication cable fixed in the insulator half.

FIG. 4 shows the ADL cable 16, arranged in the lower insulator half and oriented parallel to the GFK rod 14, with its sheath or cladding or jacket removed, to expose shortened aramide yarns or threads 34, as well as a buffered cable 36.

During the assembly of the insulator, a twin-chamber sack containing for example 2*50 g of a two-component silicone resin (preferably LSR - Liquid Silicone Rubber) is preferably used. After the mixing of the two components, the silicone resin is applied to the opposed surfaces of the insulator element 4 and 22, and shields 6 and 26, and the insulator halves 4 and 22 with the half-pipes 2 and 20 fixed therein are placed together and are heated to approximately 100° C. for approximately five minutes, and are thereby connected with one another in an adhesive fashion. Subsequently, the epoxy casting resin used as a filling compound, preferably Protolin 51, is brought, via the bored filling holes 30, into the hollow body formed by the half-pipes 2 and 20 which is sealed at its end by means of two silicone stoppers 18. The resin fuses with the ADL cable fixed in the half-pipe 2 by a plastic compound (e.g., Prestik), with the GFK rod 14 and with the half-pipes 2 and 20 to form a unit having tensile strength. During the filling with Protolin of the hollow space bounded by the two half-pipes 2 and 20 and the stoppers 18, the insulator should be arranged horizontally.

Figure 5:
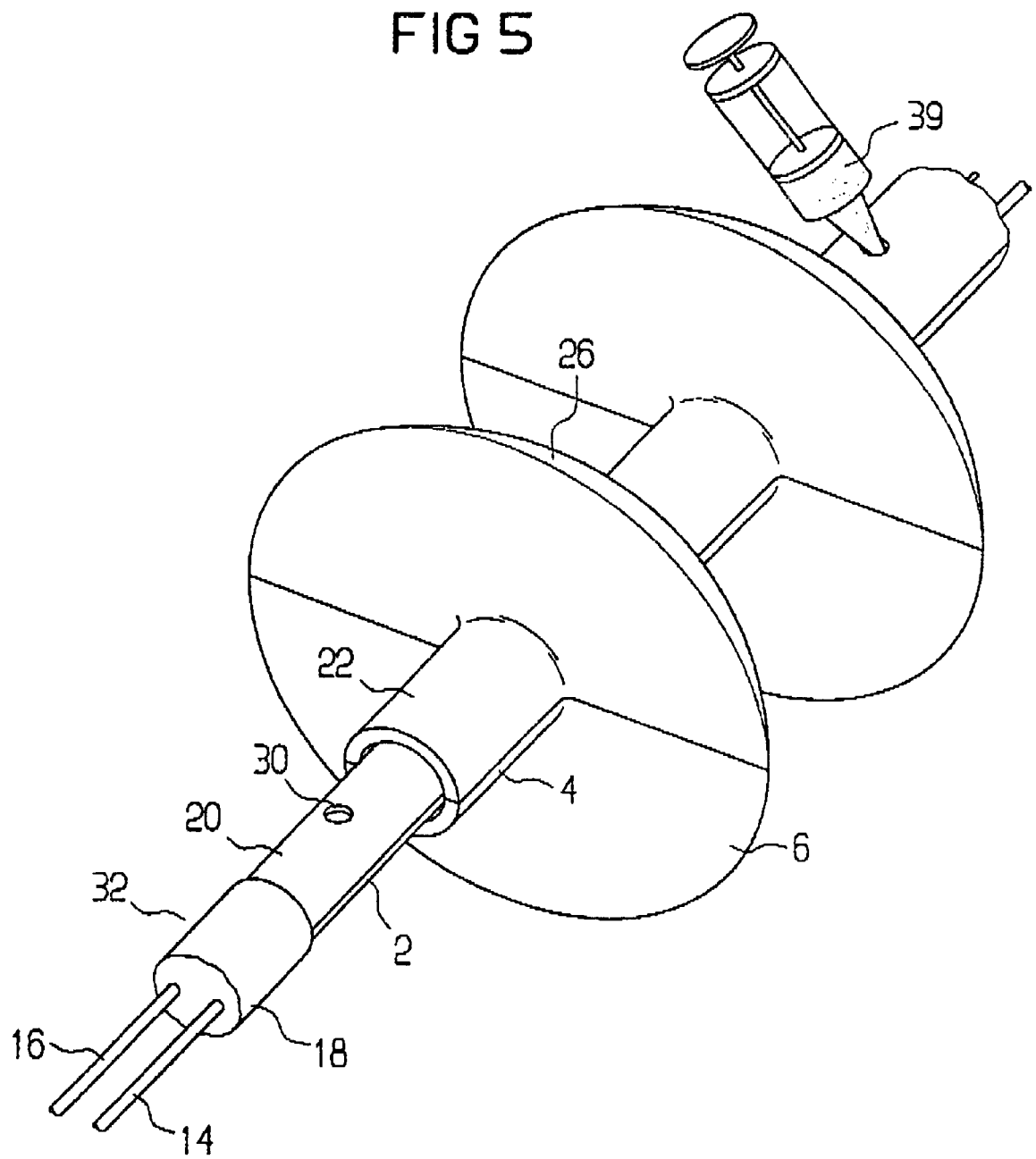
FIG. 5 is a perspective view of the assembled insulator being filled with a casting resin.

FIG. 5 shows the insulator body, which is essentially of rotationally symmetrical construction, during the filling. The epoxy casting resin used as a filling compound is brought into the hollow space by means of a spray vessel 38, via a bored hole, whereby the air displaced by the casting resin escapes via the bored hole 30.

We claim:

1. An insulator for guiding an optical cable held on a phase cable of a high-voltage aerial line, said insulator being composed of two insulating parts, which are subsequently assembled around an already-assembled cable, each of the insulating parts comprising:
    a semi-circular half-pipe, the semi-circular half-pipe is stable both in the transverse and longitudinal direction; and
    an insulator element, the insulator element surrounds a portion of the half-pipe and is connected to said half-pipe.

2. An insulator according to claim 1, wherein each of the half-pipes is made of a glass-fiber-reinforced plastic and the insulator element is made of silicone.

3. An insulator according to claim 2, wherein both the half-pipes and the insulator elements are each provided with corresponding guide pins and guide elements for assisting in assembling of the parts on an optical cable.

4. An insulator according to claim 3, wherein one of the half-pipes has a rod glued therein and protruding from the half-pipe, said rod being made of a material having a tensile strength.

5. An insulator according to claim 4, wherein the rod and the optical cable have approximately the same diameter.

6. An insulator according to claim 3, wherein at least one of the half-pipes is provided with a filling hole to fill a cavity of the insulator and a hole for evacuating of air.

7. An insulator according to claim 6, wherein the insulator includes a slotted sleeve being applied to the ends of the half-pipes to facilitate connecting the half-pipes together.

8. An insulator according to claim 1, wherein both the half-pipes and the insulating elements are provided with corresponding guide pins and guide elements to facilitate assembling the half-pipes on an optical cable.

9. An insulator according to claim 1, wherein one of the half-pipes has a rod glued therein, said rod protruding from said half-pipe and being made of a material having a high tensile strength.

10. An insulator according to claim 9, wherein the rod and the optical cable have approximately the same diameter.

11. An insulator according to claim 1, which includes a slotted sleeve for each end of the half-pipes, said sleeve being assembled on the assembled half-pipes to hold the half-pipes together.

12. An insulator according to claim 1, wherein at least one of the half-pipes is provided with a filling hole to fill a cavity of the insulator and a hole for evacuating of air.

13. An insulator according to claim 12, which includes a slotted sleeve for each end of the insulator, said slotted sleeve being assembled on the ends of the assembled half-pipes to hold the half-pipes together.

14. An insulator for guiding an optical cable held on a phase cable of a high-voltage aerial line, comprising:
    a first insulating part, the first insulating part comprising a first semi-circular half-pipe and a first insulator element, wherein the first insulator element is connected to the first semi-circular half-pipe, and the first insulator element surrounds a portion of the first half-pipe;
    a second insulating part, the second insulating part comprising a second semi-circular half-pipe and a second insulator element, wherein the second insulator element is connected to the second semi-circular half-pipe, and the second insulator element surrounds a portion of the second half-pipe; and
    at least one slotted sleeve, the at least one slotted sleeve being attached to an assembled end of the first and second half-pipe.

15. The insulator according to claim 14, wherein the first half-pipe is made of a glass-reinforced plastic and the first insulator element is made of silicone.

* * * * *